Patented Oct. 3, 1933

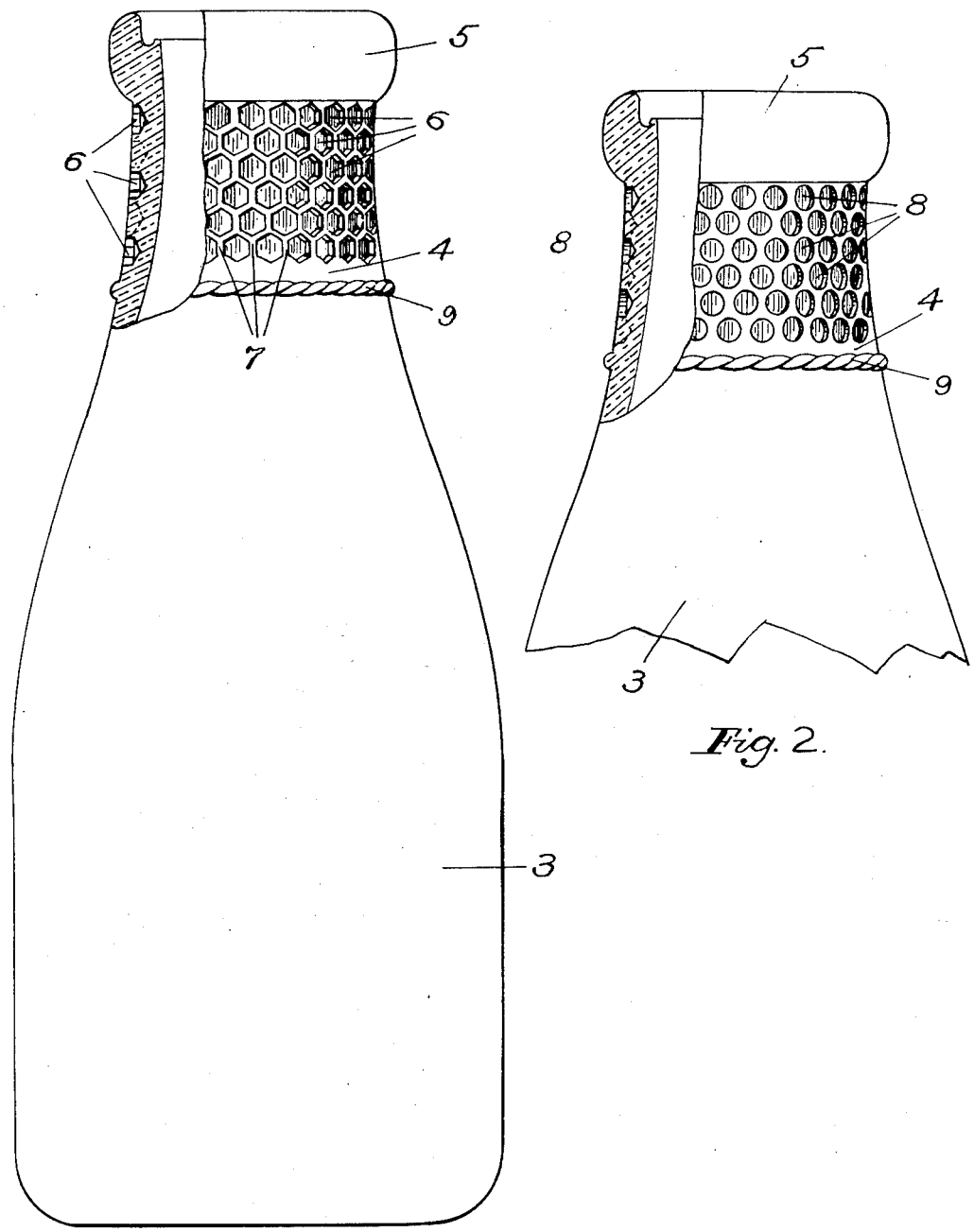

1,929,221

UNITED STATES PATENT OFFICE 1,929,221

ANTIDRIP BOTTLE

Carl O. Swanson, Minneapolis, Minn.

Application May 31, 1933. Serial No. 673,660

7 Claims. (Cl. 215—31)

This invention relates to improvements in bottles, particularly of the type extensively employed for domestic as well as restaurant and hotel use, for milk and cream, and the primary object is to provide means of a novel, efficient and practical nature for preventing the drip of milk and cream from flowing down over the outer face of the bottle after part of the contents have been poured from the bottle. It is a common and well known objection or fault to milk and cream bottles of the conventional form now in use that when a part of the contents thereof is poured out the generally rounded or enlarged pouring edge causes a portion of the liquid to adhere sufficiently so that when the bottle is again righted, after each pouring, such liquid will run down the side of the bottle rendering it slippery to hold and will also invariably reach and spread under the bottle to wet up and soil the table, refrigerator shelf, or other surface upon which the bottle is set.

A further object is to provide anti-dripping means that will serve the additional purpose of so roughening or forming the bottle surface about the neck portion thereof that it will present a better grip and thus tend to prevent slipping of the bottle out of the hand. More specifically my purpose is to provide the neck surface of the bottle with profusely distributed indents or small pockets that are of such size and shape that when drops of liquid run down over the bottle lip and upon the indented area such drops will by reason of capillary action or surface tension seek and immediately fill and adhere in the indents with which they come in closest proximity. The milk or cream thus lodging in the indents will, by reason of the relatively large surface area tension, adhere very persistently, so that they cannot escape even if the bottle is agitated, and while so adhering will of course immediately start to congeal and evaporate so as to cause no further inconvenience. The ribs or partitions separating the indents form the reticulated or desired non-slipping neck surface area.

Two preferred embodiments of the invention are illustrated in the accompanying drawing, wherein,—

Fig. 1 is an elevation of a conventional form of milk or cream bottle embodying one form of the invention.

Fig. 2 is an elevation, corresponding to the upper end of Fig. 1, but showing a slightly modified application of the invention.

Referring to the drawing more particularly and by reference characters, 3 designates a bottle of the type generally employed for the dispensing of milk and cream. The bottle, as shown, has a comparatively large opening and the neck 4 is somewhat narrower than the body proper. The upper end is grooved to receive a cap (not shown), and the upper end is reinforced by what may be designated as an enlarged, integral, and generally rounded pouring lip 5.

In the preferred form of the invention, as illustrated in Fig. 1, the neck portion 4 is provided about its entire outer surface with a profusely distributed series of pockets or indents 6, separated by a network of partitions or ribs 7. The indents 6 are preferably of hexagonal form so that the ribs 7 will have a substantially uniform width throughout the network. The indents may also have other forms or contours, an example of which is shown in Fig. 2, wherein the indents or pockets 8 are of circular form.

Disposed immediately below the annular reticulated area I preferably provide the bottle with an integrally formed bead 9 which supplements the function of the reticulated surface, and also is intended to add to the general appearance of the bottle.

It will now be seen, as has already been mentioned, that when the bottle is tipped to drain it of some of its contents and is again righted, that the lip 5, necessarily being of relatively large and well rounded form because of the fact that it must provide the necessary cap groove, will invariably cause a certain though small part of the poured milk or cream to adhere to the lip, and when the bottle is again righted this liquid will ordinarily flow down over the surface of the bottle with the undesirable effects already noted. In the present instance, however, when the drop or drops reach the reticulated surface they will, because of capillary traction or surface adhesion, immediately run into and lodge in the indents 6 (or 8). If there is enough overflow liquid to form more than one drop they will of course successively lodge in adjacent indents. It will now be found that the liquid thus lodging will remain in the indents even though the bottle is again tilted or in any way agitated, and will of course congeal and evaporate or dry in a very short time so as not to give any further trouble.

It may be noted as a matter of considerable importance that it is preferable to form the indents during the molding process when the bottle is made rather than attempt to cut or drill them in after the bottle has been formed, particularly so because the molded indents will not leave sharp edges such as otherwise would be the case, and this in turn results in a more efficient lodging of the liquid because of the fact that the liquid will more readily follow the glass surface into the indents.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A milk or cream bottle having an annular portion of its outer neck surface provided with profusely distributed indents into which liquid running down from the pouring lip of the bottle may lodge and be retained by surface adhesion.

2. A milk or cream bottle having an annular portion of its outer neck surface provided with profusely distributed indents into which liquid running down from the pouring lip of the bottle may lodge and be retained by surface adhesion, said indents being in such proximity to each other that the intervening surface portions will form a roughened gripping surface.

3. A milk or cream bottle having an annular portion of its outer neck surface provided with profusely distributed indents into which liquid running down from the pouring lip of the bottle may lodge and be retained by surface adhesion, said indents being in such proximity to each other that the intervening surface portions will form a roughened gripping surface, though not extending outwardly from the normal outer surface of the bottle.

4. A bottle having a portion of its outer surface provided with profusely distributed indents defined by a network of integrally formed separating ribs, said indents being of a size to produce surface adhesion to attract and retain drops of liquid coming into contact therewith.

5. A milk or cream bottle having an annular portion of its outer neck surface provided with profusely distributed indents into which liquid running down from the pouring lip of the bottle may lodge and be retained by surface adhesion, and a bead formed integrally with the bottle and extending thereabout below said annular portion.

6. A bottle having a portion of its outer surface provided with profusely distributed indents defined by a network of integrally formed separating ribs, said indents being of a size to produce surface adhesion, and hexagonal in shape.

7. A bottle having a portion of its outer surface provided with profusely distributed indents defined by a network of integrally formed separating ribs, said indents being of a size to produce surface adhesion, and being molded into the bottle when the latter is made.

CARL O. SWANSON.